April 25, 1967     D. H. ALDEBORGH     3,315,365

ANVILS FOR COMPARATOR GAGES

Filed March 3, 1965     2 Sheets-Sheet 1

INVENTOR.
DAVID H. ALDEBORGH

BY

ATTORNEYS

April 25, 1967  D. H. ALDEBORGH  3,315,365
ANVILS FOR COMPARATOR GAGES
Filed March 3, 1965  2 Sheets-Sheet 2

INVENTOR.
DAVID H. ALDEBORGH
BY
ATTORNEYS

United States Patent Office 3,315,365
Patented Apr. 25, 1967

3,315,365
ANVILS FOR COMPARATOR GAGES
David H. Aldeborgh, Poughkeepsie, N.Y., assignor to Standard Gage Corporation, Inc., Poughkeepsie, N.Y., a corporation of New York
Filed Mar. 3, 1965, Ser. No. 436,865
7 Claims. (Cl. 33—147)

The present invention relates to the gaging art and particularly to anvils on which work pieces are placed in order to compare the dimensions thereof with standard dimensions as determined by Johansson or Hoke blocks or the like.

Comparator gage anvils are made in a number of forms and it has been common to utilize a single purpose anvil adapted to the particular work to be measured. This, however, requires that the anvil be removed and replaced with an anvil of different form each time that the comparator is to be utilized for checking the dimensions of work pieces of a different type.

The present invention provides comparator anvils which are multipurpose and which are arranged to be rotated about a center and to thus provide a "passing" reading of the dial indicator, forming part of the comparator. Also, of course, rotation of the anvil is effective to place the particular area of the anvil adapted to the work at hand in gaging position.

It is an object of the invention to provide a multipurpose comparator anvil.

It is another object of the invention to provide such an anvil which is so arranged that passing readings of a dial indicator may be obtained.

It is a further object of the invention to provide such multipurpose anvils wherein a simple rotation of the anvil presents a different section thereof for cooperation with the dial indicator contact so that no time is lost in adjusting the anvil positionally to accommodate the measurement desired.

Other objects and features of the invention will be apparent when the following description is considered in connection with the annexed drawings, in which, FIGURE 1 is a perspective view of a comparator of the dial indicator type having an anvil in accordance with the present invention in position thereon;

Figure 1:
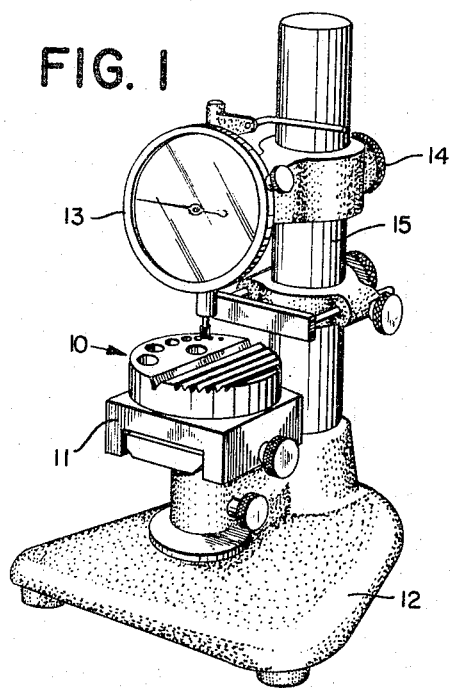
Figure 2:
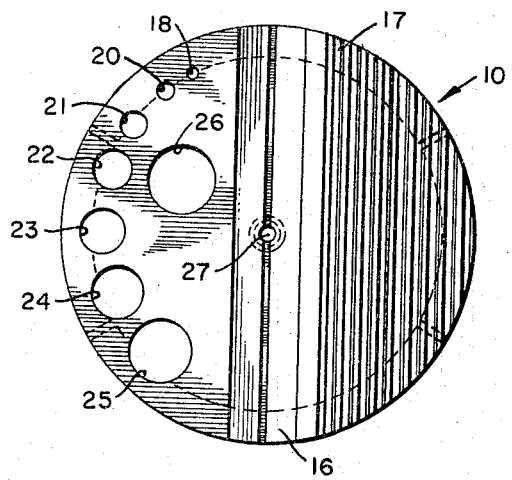
FIGURE 2 is a top plan view of one form of multipurpose anvil useful in checking straightness or roundness of cylindrical parts as well as to check flat parts and in addition to check shoulder spacing.
Figure 3:
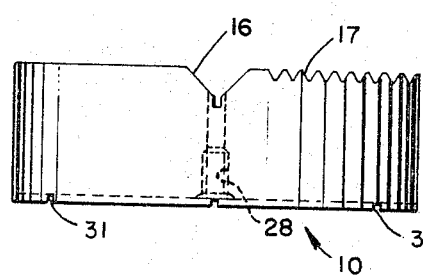
FIGURE 3 is a side elevational view of the anvil of FIGURE 2.
Figure 4:
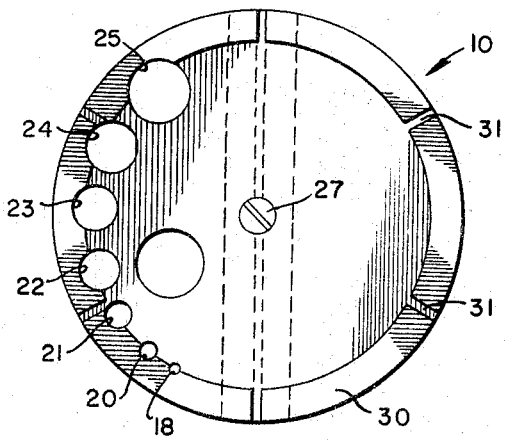
FIGURE 4 is a bottom plan view of the anvil of FIGURE 2.

Referring now to the drawings and particularly to FIGURES 1 through 4, the anvil 10 of those figures is mounted on the usual comparator table 11 which is supported from the base 12 of the comparator stand. In the usual manner dial indicator gage 13 is adjustably supported by means of the clamp 14 on the column 15 of the comparator. The dial indicator clamp 14 is provided with vernier adjustment means so that the vertical position of the indicator above the anvil can be very finely adjusted and usually the position of the dial indicator is set by means of Johansson or Hoke blocks to a definite dimension above the anvil and the clamp fixed at this point, the indicator bezel ring being adjusted so that the zero point is in a predetermined position, generally at the top. Thereafter work pieces can be compared to the set dimension.

Of course if the work piece is cylindrical, for example, a master cylinder of the desired size is utilized in place of the blocks for setting the dial indicator at the proper height on the column and other special shapes are utilized as masters when gaging blocks do not suffice.

The anvil 10 is generally circular or more exactly cylindrical and on its upper surface extending diametrically thereof is provided with a 90° V groove 16 for checking the straightness or roundness of cylindrical parts. In the particular instance shown this V groove is ½" in width and is useful for checking the straightness or roundness of cylindrical parts up to ⅝" in diameter. To the right side of the V the upper surface is provided with a plurality of serrations 17 and is utilized for checking either flat or cylindrical parts. The serrations are of course provided in order that the anvil may be readily kept clean so that no error will occur due to the part resting on accumulations of dirt or grease on the anvil surface.

To the left of the V the anvil is provided with a plurality of vertical bores 18, 20, 21, 22, 23, 24, 25 and 26 which are particularly useful in the checking of shoulder spacings. For example, a part formed of cylinders of two diameters meeting in a shoulder can be checked by placing the portion of lesser diameter in one of the holes and checking the height of the end of the piece thus determining the distance from the end to the shoulder. In the particular instance shown the holes are, in the order mentioned above, of $\frac{5}{64}''$, $\frac{9}{64}''$, $\frac{13}{64}''$, $\frac{17}{64}''$, $\frac{21}{64}''$, $\frac{25}{64}''$, $\frac{29}{64}''$ and $\frac{33}{64}''$ in diameter respectively. In addition to the ability to check shoulders as mentioned above, there is sufficient flat area on the left hand side of the anvil to provide adequate reference for checking spherical or other shaped parts.

The anvil 10 is mounted on the table 11 by means of a screw 27 which extends upwardly through the table 11 and threads into a centrally located tapped hole 28 in the anvil 10. The lower surface of the anvil 10 is relieved at its central portion leaving a downwardly extending rim 30, the rim being provided with spaced rectangular notches 31. Rim 30 rests upon the table 11 and both are ground and lapped to be perfectly flat. The notches 31 are provided in order that any accumulation of dirt or foreign material may be scraped from the table as the anvil is rotated about the screw 27 to assure that complete parallelism of the table and anvil faces is present and to thus assure that the plane of the face of the anvil is perpendicular to the measuring contact of the dial indicator.

As will be seen a work piece placed in any of the gaging locations above described can be dimensionally checked by means of a passing reading since the dial indicator gage may be set in a specific position and the anvil, with the work piece thereon, oscillated slightly about the screw 27 to pass the piece beneath the indicator plunger thereby providing for a reading as the indicator hand is displaced the maximum amount from its zero position.

Figure 5:
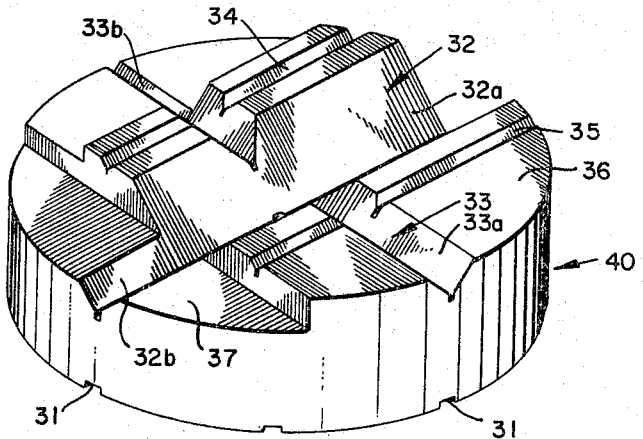
FIGURE 5 is a perspective view of a modified multipurpose anvil which is provided with a plurality of V's for checking roundness and straightness as well as the true diameter of cylindrical parts of a considerable range in diameter.
Figure 6:
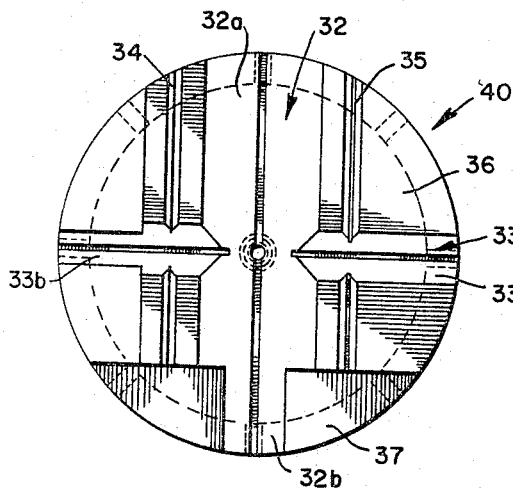
FIGURE 6 is a top plan view of the anvil of FIGURE 5.
Figure 7:
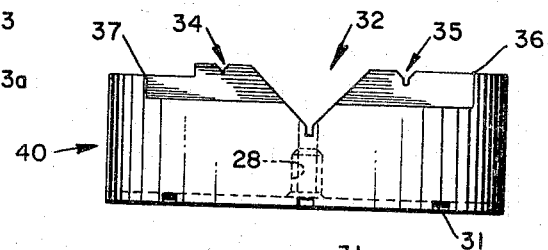
FIGURE 7 is an elevational view of the anvil of FIGURE 5.
Figure 8:
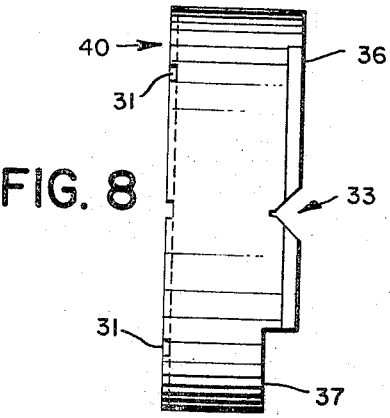
FIGURE 8 is another elevational view taken at right angles to the view of FIGURE 7.
Figure 9:
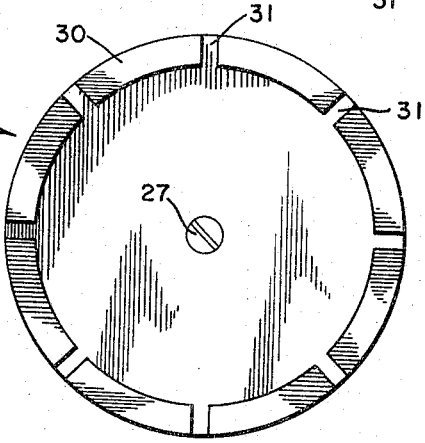
FIGURE 9 is a bottom plan view.

A slightly modified form of multipurpose anvil is shown in FIGURES 5 through 9. This anvil is intended for checking the roundness and straightness as well as the true diameter of cylindrical parts.

In the particular anvil shown there are provided two V grooves 32 and 33 which cross at the center of the anvil thus making effectively four V's. Additionally two V's are provided, one on either side of the main V groove 32, these latter V grooves being designated 34 and 35. The width of the various grooves are different and all V grooves are of 90° i.e. 45° each side of a central plane, each groove being provided with a clearance notch at its base to eliminate erroneous readings due to accumulations of material in the groove.

The upper surface 36 of the anvil 40 is cut away to provide a portion 37 at a lower elevation, this serving to provide a portion 32a of V groove 32 of a greater width and a second portion 32b of a lesser width. Also the width of the V groove 35 is different than that of either the portion 32a or 32b and, in fact, different from that of any other V groove. In other words, the V groove 34 is of a still different width and so are the portions 33a and 33b of the V groove 33. In the particular instance shown V groove portion 32a has a width of ⅞", V groove portion 32b has a width of 7/16", groove portion 33a has a width of ⅜", groove portion 33b has a width of 3/16", groove portion 34 has a width of 1/16" and groove portion 35 has a width of ⅛".

Since the construction of the anvil 40 is identical with that of the anvil 10 as respects the mode for mounting it for rotation on the table 11, the description of that construction will not be repeated and the reference characters used with respect to anvil 10 are utilized with respect to anvil 40.

It will be seen that a wide variety of cylindrical work pieces can be checked for straightness and roundness as well as true diameter by utilizing a selected one of the V's described and that furthermore by oscillation of the anvil about its center a passing reading can be readily procured. Of course in checking diameter a correction factor (0.8284) must be applied to the measured differences.

It should be noted also that there are a number of flat areas available for the checking of spherical or other shaped parts and thus the anvil is extremely useful and may be used for its many purposes while still procuring the sweep or passing readings of the indicator which are desirable.

While I have described a preferred embodiment of the invention, it will be understood that I wish to be limited not by the foregoing description, but solely by the claims granted to me.

What is claimed is:

1. An anvil for a dial comparator gage comprising, in combination, a shallow cylindrical block, a plurality of different gaging surfaces formed in the upper surface of said block adapted to receive pieces of varying shapes and dimensions to be gaged, means adapted to mount said anvil on a comparator table for rotation about the center of said block whereby a convex piece on the upper surface of said anvil is placed in gaging position and oscillation of said block about its center of rotation gives a passing reading on the dial indicator, a recess in the lower surface of said block, said recess forming an annular rim, said rim resting on the table and a plurality of notches extending radially through said annular rim whereby rotation of said anvil about its center cleans the table and assures maintenance of the upper surface of the anvil in the desired plane perpendicular to the axis of the dial indicator.

2. An anvil for a dial comparator gage comprising, in combination, a shallow cylindrical block, a 90° V groove extending across a diameter of said block, a plurality of serrations extending parallel to said groove and occupying the area to one side of said groove, a plurality of holes of fixed diameter extending through the block at the opposite side of said V groove, means adapted to mount said anvil on a comparator table for rotation about the center of said block whereby pieces on the serrated surface can be gaged and the dimension from a shoulder to the end of a piece placed in one of said holes can be gaged, gaging of convex pieces being performed by oscillating said anvil about its center to give a passing reading on the dial indicator, a recess in the lower surface of said block, said recess forming an annular rim resting on the table and a plurality of notches extending radially through said annular rim whereby rotation of said anvil about its center cleans the table and assures maintenance of the upper surface of the anvil in the desired plane perpendicular to the axis of the dial indicator.

3. An anvil for a dial comparator gage comprising, in combination, a shallow cylindrical block, a 90° V groove formed in the upper surface of said block and extending across a diameter thereof, a segment of reduced height at one end of said groove, the chord defining said segment extending perpendicular to the groove axis and dividing said groove into portions of different depths, a second 90° V groove formed in said surface on a diameter perpendicular to said first diameter, said second groove having a depth different than the depths of the two portions of said first groove, and means adapted to mount said anvil on a comparator table for rotation about the center of said block whereby a piece on the upper surface of said block in one of said V groove portions may be positioned to be gaged by the dial indicator and whereby oscillation of said block about its center of rotation gives a passing reading on the dial indicator.

4. An anvil for a dial comparator gage comprising, in combination, a shallow cylindrical block, a 90° V groove formed in the upper surface of said block and extending across a diameter thereof, a segment of reduced height at one end of said groove, the chord defining said segment extending perpendicular to the groove axis and dividing said groove into portions of different depths, a second 90° V groove formed in said surface on a diameter perpendicular to said first diameter, said second groove having a depth different than the depths of the two portions of said first groove, means adapted to mount said anvil on a comparator table for rotation about the center of said block whereby a piece on the upper surface of said block in one of said V groove portions may be positioned to be gaged by the dial indicator and whereby oscillation of said block about its center of rotation gives a passing reading on the dial indicator, a recess in the lower surface of said block, said recess forming an annular rim, and a plurality of notches extending radially through said annular rim whereby rotation of said anvil about its center cleans the table and assures maintenance of the upper surface of the anvil in the desired plane perpendicular to the axis of the dial indicator.

5. An anvil for a dial comparator gage comprising, in combination, a shallow cylindrical block, a 90° V groove formed in the upper surface of said block and extending across a diameter thereof, a segment of reduced height at one end of said groove, the chord defining said segment extending perpendicular to the groove axis and dividing said groove into portions of different depths, a second 90° V groove formed in said surface on a diameter perpendicular to said first diameter, said second groove having a depth different than the depths of the two portions of said first groove, a third 90° V groove of different depth than either portion of said first groove and of said second groove, said third V groove extending parallel to said first V groove at one side thereof, a fourth 90° V groove having its depth different than the depth of any previously mentioned V groove or portion, said fourth V groove extending parallel to said first V groove and on the opposite side thereof from said third V groove, and means adapted to mount said anvil on a comparator table for rotation about the center of said block whereby a piece on the upper surface of said anvil is placed in gaging position and oscillation of said block about its center of rotation gives a passing reading on the dial indicator.

6. An anvil for a dial comparator gage comprising, in combination, a shallow cylindrical block, a 90° V groove formed in the upper surface of said block and extending across a diameter thereof, a segment of reduced height at one end of said groove, the chord defining said segment extending perpendicular to the groove axis and dividing said groove into portions of different depths, a second 90° V groove formed in said surface on a diameter perpendicular to said first diameter, said second V groove having a depth different than the depths of the two portions of said first groove, a third 90° V groove of different depth than either portion of said first groove and of said second groove, said third groove extending parallel to said first V groove at one side thereof, a fourth 90° V groove having its depth different than the depth of any previously mentioned V groove or portion, said fourth V groove extending parallel to said first V groove and on the opposite side thereof from said third V groove, said V groove portions being adapted to determine diameter and straightness of cylindrical pieces placed in said grooves, the flat areas between grooves being adapted to gage pieces of shapes other than cylindrical, and means adapted to mount said anvil on a comparator table for rotation about the center of said block whereby a piece on the upper surface of said block in one of said V groove portions may be positioned to be gaged by the dial indicator and whereby oscillation of said block about its center of rotation gives a passing reading on the dial indicator.

7. An anvil for a dial comparator gage comprising, in combination, a shallow cylindrical block, a 90° V groove formed in the upper surface of said block and extending across a diameter thereof, a segment of reduced height at one end of said groove, the chord defining said segment extending perpendicular to the groove axis and dividing said groove into portions of different depths, a second 90° V groove formed in said surface on a diameter perpendicular to said first diameter, said second groove having a depth different than the depths of the two portions of said first groove, means adapted to mount said anvil on a comparator table for rotation about the center of said block whereby a piece on the upper surface of said block in one of said V groove portions may be positioned to be gaged by the dial indicator and whereby oscillation of said block about its center of rotation gives a passing reading on the dial indicator, and means adapted to mount said anvil on a comparator table for rotation about the center of said block whereby a piece on the upper surface of said block in one of said V groove portions may be positioned to be gaged by the dial indicator and whereby oscillation of said block about its center of rotation gives a passing reading on the dial indicator.

References Cited by the Examiner

UNITED STATES PATENTS

| | | | |
|---|---|---|---|
| 1,878,493 | 9/1932 | Graham | 33—174 |
| 1,908,276 | 5/1933 | Aldeborgh | 33—147 |
| 2,811,781 | 11/1957 | Johnson et al. | 33—174 |
| 3,212,193 | 10/1965 | Raccio | 33—174 |

FOREIGN PATENTS 607,512  9/1948  Great Britain.

LEONARD FORMAN, *Primary Examiner.*

SAMUEL S. MATTHEWS, *Assistant Examiner.*